(12) United States Patent
Xing et al.

(10) Patent No.: US 6,936,308 B2
(45) Date of Patent: Aug. 30, 2005

(54) CONTINUOUS IN-LINE PROCESS FOR MAKING INK-JET RECORDING MEDIA COMPRISING A RADIATION-CURED COATING LAYER

(75) Inventors: Linlin Xing, West Warwick, RI (US); Cau The Ho, Providence, RI (US)

(73) Assignee: Arkwright, Inc., Fiskeville, RI (US)

( * ) Notice: Subject to any disclaimer, the term of this patent is extended or adjusted under 35 U.S.C. 154(b) by 0 days.

(21) Appl. No.: 10/613,198

(22) Filed: Jul. 3, 2003

(65) Prior Publication Data

US 2004/0009301 A1 Jan. 15, 2004

Related U.S. Application Data

(62) Division of application No. 09/863,552, filed on May 23, 2001, now Pat. No. 6,610,388.

(51) Int. Cl.[7] ............................. B05D 1/38; B05D 3/06; B05D 5/04
(52) U.S. Cl. ..................... 427/487; 427/532; 427/535; 427/553; 427/407.1
(58) Field of Search ........................ 427/407.1, 411, 427/391, 395, 372.2, 505, 513, 553, 496, 501, 551, 535, 538, 595, 385.5; 428/32.1, 32.18, 32.2, 32.21, 32.26, 32.31, 32.33

(56) References Cited

U.S. PATENT DOCUMENTS

| | | | |
|---|---|---|---|
| 4,265,976 A | 5/1981 | Nowak | 428/486 |
| 4,364,971 A | 12/1982 | Sack et al. | 427/44 |
| 4,564,560 A | 1/1986 | Tani et al. | 428/411.1 |
| 5,102,737 A | 4/1992 | Josephy et al. | 428/411.1 |
| 5,208,092 A * | 5/1993 | Iqbal | 428/32.14 |
| 5,219,641 A | 6/1993 | Mehta | 428/211 |
| 5,372,884 A | 12/1994 | Abe et al. | 428/331 |
| 5,405,678 A | 4/1995 | Bilodeau | 428/211 |
| 5,672,392 A * | 9/1997 | De Clercq et al. | 427/391 |
| 5,677,067 A | 10/1997 | Kojima et al. | 428/478.2 |
| 5,709,976 A | 1/1998 | Malhotra | 430/124 |
| 5,800,884 A | 9/1998 | D'Anna et al. | 428/35.7 |
| 5,910,359 A | 6/1999 | Kobayashi et al. | 428/327 |
| 5,942,329 A * | 8/1999 | Nakayama et al. | 428/423.1 |
| 6,264,321 B1 * | 7/2001 | Bugner et al. | 347/101 |
| 6,326,415 B1 * | 12/2001 | Miklasiewicz et al. | 522/42 |
| 6,610,388 B2 | 8/2003 | Xing et al. | 428/195 |

FOREIGN PATENT DOCUMENTS

| EP | 0485 240 A1 | 11/1991 | |
|---|---|---|---|
| EP | 0 770 493 A1 * | 5/1997 | B41M/5/00 |

OTHER PUBLICATIONS

PCT Transmittal of Int'l Search Report, PCT/US02/16451.

\* cited by examiner

*Primary Examiner*—Timothy Meeks
*Assistant Examiner*—William Phillip Fletcher, III
(74) *Attorney, Agent, or Firm*—Barlow, Josephs & Holmes, Ltd.

(57) ABSTRACT

Ink-jet recording media and continuous in-line process for manufacturing such media are provided. The media can be printed with ink-jet printers to form images having good color density, brilliance, and resolution. The ink-jet recording media include a paper substrate coated on one surface with a radiation-curable composition and an ink-receptive composition. The back surface of the paper may be coated with a polymeric coating to reduce curl and improve dimensional stability. The media have a water vapor transmission rate of no greater than 12 grams/100 square inches/24 hours and preferably have a surface gloss of at least 70.

7 Claims, 1 Drawing Sheet

CONTINUOUS IN-LINE PROCESS FOR MAKING INK-JET RECORDING MEDIA COMPRISING A RADIATION-CURED COATING LAYER

CROSS-REFERENCE TO RELATED APPLICATIONS

This application is a divisional of U.S. patent application Ser. No. 09/863,552 having a filing date of May 23, 2001, which now has issued as U.S. Pat. No. 6,610,388 B2, the entire contents of which are hereby incorporated by reference.

BACKGROUND

1. Technical Field

This invention relates to imaging media suitable for use with ink-jet printers. More particularly, the invention relates to ink-jet recording media comprising a paper substrate coated on one surface with a radiation-curable composition and an ink-receptive composition. The other surface of the paper may be coated with a polymeric coating to improve the paper's dimensional stability. The invention also encompasses a continuous in-line process for making such imaging media.

2. Brief Description of the Related Art

Today, individual consumers and businesses are turning to ink-jet printing systems and digital technology to produce many different imaging media products. With the introduction of new computers, software, and digital cameras, consumers are now able to create greeting cards, posters, calendars, newsletters, fliers, window decals and the like in the comfort of their own homes. Companies can create small format products such as business cards, company newsletters, brochures, promotional materials, overhead transparencies, and the like. Companies can also create large indoor and outdoor advertising displays and other graphic art materials for business presentations.

In an ink-jet printing process, liquid ink is squirted through very fine nozzles in a printer. The resultant ink droplets form an image directly on a recording medium that typically comprises a coated film or paper substrate. The quality of the final image or text is partly dependent on the composition of the ink-jet recording medium particularly the coating(s) and substrate. The inks used in most ink-jet printers are aqueous-based inks containing molecular dyes or pigmented colorants. Water is the major component in aqueous-based inks. Small amounts of water-miscible solvents such as glycols and glycol ethers also may be present. Other ink-jet inks are non-aqueous based inks containing organic vehicles (e.g., hydrocarbon solvents) as the major component.

"Photo-papers" are particularly popular, because a person can produce photographic-like images on these materials. Paper substrates, e.g., plain papers, clay-coated papers, and polyethylene resin-coated papers, can be used to make photo papers. The paper substrate is coated with specially formulated coatings that are capable of receiving aqueous-based inks from ink-jet printers.

Often, the substrate is a polyethylene-coated paper. Such papers can have good dimensional stability and moisture resistance. The polyethylene coating acts as a moisture-barrier layer helping to prevent the aqueous ink vehicle from permeating into the base paper. Polyethylene-coated papers are commercially available from Jen-Coat, Inc. (Westfield, Mass.) and other companies under various trademarks.

However, there are some disadvantages with using polyethylene-coated papers, including their manufacturing costs and thermal stability. For example, it may be difficult to use polyethylene-coated papers in high temperature manufacturing operations, such as those where additional coating layers must be dried, because of polyethylene's thermoplastic properties. Further, some polyethylene-coated papers tend to have low surface gloss which may be undesirable for some commercial applications. As an alternative, clay-coated papers can be used. The cost of clay-coated papers is generally lower. But, clay-coated papers tend to absorb the aqueous ink vehicle and this absorption may lead to curling of the paper's edges and cockling of the paper's surface.

D'Anna et al., U.S. Pat. No. 5,800,884 discloses a gloss coating composition comprising radiation curable oligomers and monomers, and photosensitizers. The coating composition is applied to at least one surface of a substrate and exposed to an ultraviolet light source resulting in curing of the composition onto the substrate's surface. The patent discloses that the coating can be applied to non-woven, woven, synthetic paper, paper, paperboard, plastic, or metal substrates. The patent further discloses that the coating composition can be used as primer coat over a substrate's surface, wherein the coating surface is capable of printing with ultraviolet or ultraviolet compatible inks. Alternatively, or in addition, to the primer coat, the coating compositions are used as a top coat over a substrate surface to impart gloss characteristics, good rub resistance, and flexibility to the substrate.

Nowak, U.S. Pat. No. 4,265,976 discloses an ultraviolet radiation-curable coating composition comprising (1) chlorinated rubber, (2) chlorinated paraffin, (3) vinyl acetate, (4) trimethylolpropane triacrylate, (5) photoinitiator, and (6) heat and light stabilizers for the chlorocarbon components. The patent discloses that the coating has utility as a moisture-barrier film for the protection of substrates such as paper and cardboard. For example, the patent discloses the coating system can provide a moisture-barrier coating on detergent boxes in a single coat procedure.

Mehta et al., U.S. Pat. No. 5,219,641 discloses using a radiation-curable coating on certain substrates to make them receptive to images from a thermal transfer printer. The coating is a blend of radiation-curable oligomers and monomers, and optionally a free radical initiator. The patent discloses that the coating may be applied to coated or non-coated electronic data processing papers, bond papers, high quality calendared papers, cast coated papers, and other business forms.

The ink-jet industry is looking to develop new paper-based media capable of absorbing aqueous inks to form high quality images having good color density, brilliance, and resolution. The media should have good moisture-barrier properties and preferably have high surface gloss. A cost-effective and efficient manufacturing process for making such media would also be desirable. The present invention provides such ink-jet recording media and a continuous in-line process for manufacturing the media.

The ink-jet recording media of this invention comprise a radiation-cured layer and polymeric ink-receptive layer. The radiation-cured layer helps retain the surface gloss of the media and provides good moisture barrier properties. Significantly, the radiation-cured layer is thermally stable at temperatures greater than temperatures at which conventional polyethylene and related thermoplastic materials (e.g., olefin-based polymers and copolymers) are thermally stable.

SUMMARY

The present invention relates to an ink-jet recording medium comprising: a) a paper substrate, b) a radiation-cured layer overlaying a surface of the paper substrate, and c) a polymeric ink-receptive layer overlaying the radiation-cured layer, the ink-jet recording medium having a water vapor transmission rate of no greater than 12 grams per 100 square inches per 24 hours (5 g/100 in$^2$/24 hrs). Preferably, the water vapor transmission rate is no greater than 8 g/100 in$^2$/24 hrs. The medium preferably has a glossy surface luster. In such glossy media embodiments, the surface gloss is at least 70, and it is more preferably in the range of about 85 to about 95. In other embodiments, satin-like media having surface gloss values in the range of 20 to 70 can be made. In still other embodiments, matte-like media having surface gloss values less than 20 can be made.

Preferably, the paper substrate is a clay-coated paper having a thickness in the range of about 4 to about 8 mils. The radiation-cured layer can be formed by irradiating a coating comprising a radiation-curable oligomer and photoinitiator. Preferably, the coating used to form the radiation-cured layer comprises at least about 60% oligomer and 3% photoinitiator by weight. The coating can further comprise radiation-curable monomer and additives. For example, a coating comprising 60% oligomer, 3% photoinitiator, 20% monomer, 15% pigment, and 2% UV light stabilizer by weight can be used. Suitable oligomers include acrylated polyethers, acrylated polyesters, and acrylated acrylics. Suitable monomers include trimethylolpropane trimethacrylate. Suitable photoinitiators include 1-hydroxy-cyclohexyl phenyl ketone and a blend of trimethylbenzophenone, polymeric hydroxy ketone, and trimethylbenzoyldiphenyl phosphine oxide. Generally, the radiation-cured layer has a weight in the range of about 1 to about 40 grams/square meter. Ultraviolet light or electron beam irradiation can be used to cure the coating.

The ink-receptive layer can comprise a water-soluble binder resin, for example, polyvinyl alcohols, poly(vinyl pyrrolidone), poly(2-ethyl-2-oxazoline), methylcellulose, poly(ethylene oxide), and copolymers and mixtures thereof. Preferably, the coating comprises at least 40% water-soluble binder by weight. The coating can further comprise a water-dispersible resin. Multiple ink-receptive layers can be applied to substrate. Generally, the dry coat weight of the ink-receptive layer is in the range of about 5 to about 50 grams/square meter.

In another embodiment of this invention, the back surface of the base paper is coated with a polymeric coating that further helps prevent moisture from penetrating into the base paper. Suitable water-dispersible resins include, for example, polyvinyl chloride; vinyl chloride copolymers; polyvinylidene chloride; vinylidene chloride copolymers; acrylates; methacrylates; polyvinyl acetate; polyacrylonitrile; polystyrene; styrene copolymers; and mixtures thereof. Alternatively, the polymeric layer on the back surface of the paper can be a radiation-cured layer formed by irradiating a coating containing radiation-curable oligomers, monomers, photoinitiators and additives.

The present invention also relates to a continuous in-line process for making an ink-jet recording medium. In one embodiment, the process comprises the steps of a) applying a radiation-curable coating to a surface of a substrate material, b) irradiating the radiation-curable coating so that the coating undergoes a curing process, and c) applying an ink-receptive coating over the irradiated coating. Preferably, the media produced by the continuous process have a water vapor transmission rate of no greater than 12 g/100 in$^2$/24 hrs and more preferably no greater than 5 g/100 in$^2$/24 hrs. Glossy media having a surface gloss greater than 70 as well as satin-like media having a surface gloss in the range of 20 to 70 and matte-like media having a surface gloss less than 20 can be made. The irradiated coating can be treated with corona discharge prior to applying the ink-receptive coating. In another embodiment, a coating comprising adhesion promoters can be applied over the irradiated coating prior to application of the ink-receptive coating. As described above, the back surface of the substrate material can be coated with a polymeric coating to enhance the material's dimensional stability. The continuous in-line process can run at a speed of at least about 60 feet per minute. The irradiated coating has good thermal stability. Thus, the substrate comprising the irradiated coating can be subjected to further treatments and processing at temperatures (e.g., 140° C. to 200° C.) greater than temperatures at which conventional polyethylene and related thermoplastic materials (e.g., olefin-based polymers and copolymers) are typically treated and processed.

DETAILED DESCRIPTION OF THE PREFERRED EMBODIMENTS

Figure 1:
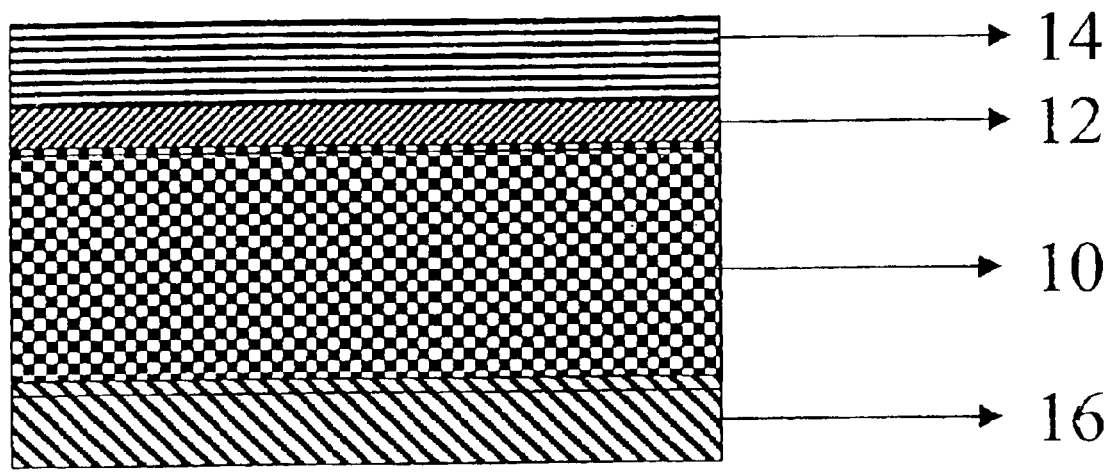
FIG. 1 is a schematic side view of one embodiment of the ink-jet recording medium of this invention.

Referring to FIG. 1, the ink-jet recording medium comprises a paper substrate (10) having two surfaces. The first surface which is coated with the radiation-cured layer and ink-receptive layer may be referred to as the "front" or "imaging" surface. The second surface which is opposite to the first surface may be coated with the polymeric coating and may be referred to as the "back" or "non-imaging" surface. Paper substrates are known in the ink-jet industry, and any suitable paper may be used in the present invention. For example, plain papers, clay-coated papers, or resin-coated papers may be used. Preferably, the paper is a clay-coated paper. Suitable paper substrates include, for example, Centura Cover 60# paper (available from Consolidated Papers, Inc.) and Polyjet Base 112# paper (available from P.H. Glatfelter Company). The base weight of the paper is not particularly restricted, but it should be generally in the range of about 80 grams per square meter (gsm) to about 250 gsm, preferably in the range of 130 gsm to 180 gsm. The thickness of the paper is not particularly restricted, but it should be generally in the range of about 4 mils to about 8 mils. The paper substrate may be pre-treated with conventional adhesion promoters to enhance adhesion of the coatings to the paper or other primer coating.

As shown in FIG. 1, a radiation-cured layer (12) overlays the front surface of the base paper. The radiation-cured layer is prepared by first applying a radiation-curable coating to the paper substrate. The coating comprises radiation-curable oligomers and monomers such as acrylated oligomers, multifunctional acrylate monomers, difunctional and monofunctional monomers, and mixtures thereof. Radiation from an electron beam or ultraviolet (UV) light source is used to cure the wet coating. The radiation induces the formation of free radicals that initiate polymerization of the oligomers and monomers. In electron beam radiation, a barrage of electrons initiates the free radical polymerization. In ultraviolet (UV) light radiation, photoinitiators (photosensitizers) absorb the UV light and initiate the free radical polymerization.

Generally, the radiation-curable oligomers and monomers are commercially available. For example, acrylated oligomers such as acrylated polyethers, acrylated polyesters, and acrylated acrylics may be used. It is preferred that a relatively hydrophobic oligomer be used in the radiation-curable coating. Such a compound helps provide the radiation-cured layer with good moisture barrier properties because as the hydrophobicity of the oligomer increases, the moisture barrier properties improve. As a result, moisture is less likely to permeate into the base paper and paper cockling and curl are minimized. Suitable acrylated oligomers that are commercially available include LAROMER PE 44F (acrylated polyester) and LAROMER 8981 (acrylated polyester) available from BASF Corp.; EBECRYL 588 (chlorinated acrylated polyester) available from UCB Chemicals Corp.; and CN 301 (polybutadiene dimethacrylate) and CN 302 (polybutadiene diacrylate) available from Sartomer Co. Preferably, the radiation-curable coating comprises an oligomer in an amount of at least about 60% based on weight of the coating formulation. More preferably, the coating comprises a radiation-curable oligomer selected from the group consisting of acrylated polyesters, polybutadiene dimethacrylate, and polybutadiene diacrylate.

Suitable radiation-curable monomers include multifunctional acrylates such as pentaerythritol triacrylate (PETA), trimethylolpropane triacrylate (TMPTA), 1,6 hexanediol diacrylate (HODA), tritripropylene glycol diacrylate (TRPGDA), and triethylene glycol diacrylate (TREGDA). Examples of monomers that are commercially available include TMPTA-N (trimethylolpropane triacrylate) and EB-40 (tetraacrylate monomer) available from UCB Chemicals Corp. Difunctional and monofunctional monomers also may be used. Examples of monofunctional monomers include 2-ethylhexyl acrylate, vinyl acetate, butyl acrylate, dimethylaminoethyl acrylate, isobutoxymethyl acrylamide, and dimethylacrylamide. Preferably, the radiation-curable coating comprises a monomer in an amount of about 20% based on weight of the coating formulation. More preferably, the radiation-curable monomer is trimethylolpropane triacrylate (TMPTA).

In the present invention, UV light radiation is preferably used to cure the coating, and the coating formulation comprises a photoinitiator. As discussed above, in UV light radiation, photoinitiators in the coating absorb the UV light and initiate free radical polymerization. Examples of suitable photoinitiators include Benzoin ethers (Norrish type I initiator) and Benzophenone (Norrish type II initiators that require amine coinitiators to be active). IGRACURE 184 (1-hydroxy-cyclohexyl phenyl ketone) and phenylbis (2,4,6-trimethyl benzoyl)-phosphine oxide are available from Ciba Specialty Chemicals Corp., and ESACURE KTO-46 (blend of trimethylbenzophenone, polymeric hydroxy ketone, and trimethylbenzoyldiphenyl phosphine oxide) is available from Sartomer Co. Preferably, the radiation-curable coating comprises a photoinitiator in an amount of at least about 3% based on weight of the coating formulation. More preferably, the coating comprises a photoinitiator selected from the group consisting of 1-hydroxy-cyclohexyl phenyl ketone and a blend of trimethylbenzophenone, polymeric hydroxy ketone, and trimethylbenzoyldiphenyl phosphine oxide.

For purposes of the present invention, it is important that the ink-jet recording media have a water vapor transmission rate of no greater than 12.0 grams/100 square inches/24 hours as measured per the Test Methods described below. Preferably, the water vapor transmission rate is no greater than 5.0 g/100 in$^2$/24 hrs. With such media, the ink-receptive layer can absorb aqueous-based inks, and the inks tend not to permeate into the base paper. Thus, paper curling, cockling, and other printing defects can be minimized. It has been found that not all radiation-curable compositions are suitable for use in this invention. As shown in the following comparative examples, some radiation-curable coatings do not impart sufficient moisture barrier properties to the medium.

The thermal stability of the radiation-cured layer is also an important property. As discussed above, the substrate comprising the irradiated coating can be subjected to further treatments and processing at temperatures (e.g., 140° C. to 200° C.) greater than temperatures at which conventional polyethylene and related thermoplastic materials (e.g., olefin-based polymers and copolymers) are thermally stable. Ink-receptive inter-coats and topcoats can be applied to the radiation-cured layer, and these coatings can be subsequently processed without distorting or damaging the radiation-cured layer. The thermal stability of the radiation-cured can provide significant processing advantages.

For example, the thermal stability of the radiation-cured layer can permit fast or more complete drying of subsequent coating layers. Second, this thermal stability can provide for important chemical reactions to occur during processing of the media, e.g. a useful degree of cross-linking in the ink-receptive layer. Cross-linking in the ink-receptive layer may be important in achieving good water fastness as demonstrated in the Examples below. Third, this thermal stability can allow subsequent coating layers to be physically manipulated with respect to each other and external objects. In particular, the thermal stability of the radiation-cured layer makes it possible to melt the coating layers to achieve interlayer adhesion, external object adhesion e.g., with a laminating film, or a desired surface texture in different regions of the medium.

In addition, the radiation-curable coating may comprise additives such as, for example, inhibitors, surfactants, waxes, cure accelerators, defoaming agents, pigments, dispersing agents, optical brighteners, UV light stabilizers (blockers), UV absorbers, adhesion promoters, and the like. Inhibitors are used to retard or stop undesirable polymerization of the oligomers and monomers. The addition of such inhibitors to the coating formulation may be beneficial if the formulation will be placed in storage for an extended period of time. If desired, white pigments may be added to modify the whiteness of the paper. Preferably, the radiation-curable coating comprises pigment in an amount of about 15% by weight and an UV light stabilizer in an amount of about 2% based on weight of the coating formulation.

In practice, the radiation-curable oligomers and monomers are blended together with a photoinitiator and additives. The mixture may be heated to reduce its viscosity. The coating formulation may be applied to the base paper by a conventional method to form a uniform coating. Suitable methods for coating the base paper include, for example, Meyer-rod, roller, blade, wire bar, dip, solution extrusion, air-knife, curtain, slide, doctor-knife, and gravure methods. UV light may be used to cure the wet coating. Generally, the UV light has a wavelength in the range of about 200 nm to about 400 nm. Commercial UV light curing equipment may be used. Generally, such equipment includes an UV light source (e.g., a tubular glass lamp), reflectors to focus or diffuse the UV light, and a cooling system to remove heat from the lamp area. After curing, the paper may be treated with corona discharge to improve its adhesion to the ink-receptive layer. Generally, the weight of the radiation-cured layer is in the range of about 1 to about 40 grams per square meter (gsm), and the preferable weight is about 4 to about 15 gsm.

The paper substrate is coated with a polymeric ink-receptive layer (14) that overlays the radiation-cured layer. The ink-receptive layer is capable of absorbing aqueous-based inks to form glossy images having good color gamut and optical density.

The polymeric ink-receptive layer can be prepared from a coating formulation comprising at least one water-soluble binder resin. Suitable water-soluble binder resins include, for example, those selected from the group consisting of polyvinyl alcohols; modified polyvinyl alcohols (e.g., carboxyl-modified PVA, sulfonic-modified PVA, acrylamide-modified PVA, cationic-modified PVA, long chain alkyl-modified-PVA, silicone-modified PVA, maleic acid-modified PVA, and itaconic acid-modified PVA); poly(vinyl pyrrolidone); vinyl pyrrolidone copolymers; poly(2-ethyl-2-oxazoline); poly(ethylene oxide); poly(ethylene glycol); poly(acrylic acids); starch; modified starch (e.g., oxidized starch, cationic starch, hydroxypropyl starch, and hydroxyethyl starch), cellulose; cellulose derivatives (e.g., oxidized cellulose, cellulose ethers, cellulose esters, methyl cellulose, hydroxyethyl cellulose, carboxymethyl-cellulose, benzyl cellulose, phenyl cellulose, hydroxypropyl cellulose, ethyl hydroxyethyl cellulose, hydroxyethyl methyl cellulose, hydroxypropyl methyl cellulose, hydroxy butyl-methyl cellulose, dihydroxypropyl cellulose, hydroxypropyl hydroxyethyl cellulose, chlorodeoxycellulose, aminodeoxycellulose, diethylammonium chloride hydroxyethyl cellulose, hydroxypropyl trimethyl ammonium chloride hydroxyethyl cellulose, sodium cellulose sulfate, and sodium carboxymethylhydroxyethyl cellulose); alginates and water-soluble gums; dextrans; carrageenan; xanthan; chitin; proteins; gelatins; agar; and mixtures thereof.

Preferably, the ink-receptive layer comprises at least one water-soluble binder resin in an amount of at least 40% and more preferably in an amount of 45 to 96% by weight based on dry weight of the ink-receptive layer. More preferably, the water-soluble binder resin is selected from the group consisting of polyvinyl alcohols; poly(vinyl pyrrolidone); poly(2-ethyl-2-oxazoline); methylcellulose; poly(ethylene oxide); and copolymers and mixtures thereof.

In addition, the ink-receptive coating formulation may also contain a water-dispersible resin. Suitable water-dispersible resins include, for example, those selected from the group consisting of polyvinyl chloride; vinyl chloride copolymers (e.g., ethylene-vinyl chloride); polyvinylidene chloride; vinylidene chloride copolymers; acrylates; methacrylates; polyvinyl acetate; vinyl acetate copolymers (e.g., ethylene-vinyl acetate copolymers, and acrylic-vinyl acetate copolymers,) polyacrylonitrile; polystyrene; styrene copolymers (e.g., styrene-maleic acid anhydride copolymers and styrene-butadiene copolymers); rubber latex; polyesters; vinyl-acrylic terpolymers, polyacrylonitrile; acrylonitrile copolymers (e.g., butadiene-acrylonitrile copolymers, butadiene-acrylonitrile-styrene terpolymers); polyurethanes; and mixtures thereof.

In accordance with the present invention, ink-jet recording media having different surface finishes can be made. Preferably, the medium has a high surface gloss (greater than 70), and more preferably the surface gloss is in the range of about 85 to about 95. Such media are capable of absorbing aqueous-based inks to form glossy images having good color gamut and optical density. Conventional ink-jet printers, e.g., an Encad Novajet Pro50, Océ Printing Systems' Océ CS 5070, Hewlett-Packard HP 2500 or HP970 Cse can be used to print such images. The imaged ink-jet recording media can be used to make laminates by laminating a transparent film over the printed image. Both cold laminates (i.e., films that are laminated at room temperature), and hot laminates (i.e., films that are laminated at elevated temperatures) can be produced.

In other embodiments, satin-like media having surface gloss values in the range of 20 to 70 may be made. In still other embodiments, matte-like media having surface gloss values less than 20, e.g., in the range of 1 to 20, may be made.

Primarily, the ink-receptive layer imparts surface luster to the media, but the radiation-cured layer is also significant, because it helps retain surface luster.

The ink-receptive coating may also contain cationically-modified polymers that act as dye fixatives, e.g., polyquaternary ammonium salts. Further, the ink-receptive coating may contain additives such as pigments. White pigments such as titanium dioxide, zirconium oxide, zinc oxide, zinc sulfide, antimony oxide, barium sulfate, and calcium carbonate may be added to modify the whiteness of the paper. Other pigments, such as silica, alumina, alumina hydrate, clays, glass, polystyrene, starch, poly(methyl methacrylate), polytetrafluoroethylene, and the like may be added to improve the coating's ink absorption capabilities and modify its surface friction. In addition, surface active agents that control the wetting or spreading action of the coating, anti-static agents, suspending agents, acidic compounds to control the pH of the coating, optical brighteners, UV light stabilizers, defoaming agents, waxes, plasticizers, and the like may be added to the formulation.

In the present invention, the paper substrate may be coated with multiple ink-receptive layers. For example, a coating formulation (i.e., inter-coat or prime coat) comprising water, poly(vinyl pyrrolidone), poly(vinyl alcohol), polyurethane, and an optical brightener may be applied over the radiation-cured layer to form a first ink-receptive layer. After the inter-coat has been dried, a second coating formulation (i.e., top coat) comprising water, methyl cellulose, polyethylene oxide, polyurethane, and alumina may be applied over the first ink-receptive layer to form a second ink-receptive layer.

Further, the media may comprise an intermediate coating layer(s) between the radiation-cured and ink-receptive coating layers. For example, a coating comprising adhesion promoters may be applied over the radiation-cured layer to enhance adhesion of the radiation-cured layer to the ink-receptive layer.

In practice, a water-soluble binder resin may be blended with water, and a water-dispersible binder resin (optional) and additives (optional) to form a coating formulation. A pre-mix containing a portion of the water-soluble resins may be prepared first in a small vessel and then added to a larger vessel. Subsequently, additives and other resins may be added and mixed together in the larger vessel. Various coating methods may be used to apply the ink-receptive coating to the substrate including Meyer-rod, roller, blade, wire bar, dip, solution extrusion, air-knife, curtain, slide, doctor-knife, and gravure methods. The coating formulations should have a low and consistent viscosity so that they can be coated easily onto the radiation-cure layer. The coated paper may be placed in a forced hot air oven to dry the ink-receptive layer. Generally, the dry coat weight of the ink-receptive layer is in the range of about 5 to about 50 gsm, and the preferable weight is about 15 to about 25 gsm.

In addition, the back surface of the base paper may be coated a polymeric coating (16) that further helps prevent moisture from penetrating into the base paper. The polymeric coating on the back surface of the paper enhances the paper's dimensional stability and helps minimize paper curling, cockling, and other defects.

In one embodiment, a polymeric coating (16) comprising a water-dispersible film-forming resin may be prepared. Suitable water-dispersible resins include, for example, polyvinyl chloride; vinyl chloride copolymers (e.g., ethylene-vinyl chloride); polyvinylidene chloride; vinylidene chloride copolymers; vinyl acrylic copolymers, vinyl acrylic terpolymers, polyacrylates; polymethacrylates; polyvinyl acetate; polyacrylonitrile; polystyrene; styrene butadiene copolymers, styrene copolymers; and mixtures thereof. An aqueous coating formulation containing the film-forming resin may be prepared and applied to the back surface of the base paper using the coating methods described above. The polymeric coating may contain the above-described additives particularly waxes and pigments. In other embodiments, the polymeric layer on the back surface of the paper is a radiation-cured layer prepared from a coating containing radiation-curable oligomers, monomers, photoinitiators and additives as described above. If a polymeric coating is applied to the back surface, the dry coat weight of the polymeric layer is generally in the range of about 5 to about 40 gsm, and the preferable weight is about 15 to about 25 gsm.

The present invention also encompasses a continuous, in-line process for making an ink-jet recording medium. In general, the process comprises the steps of: a) applying a radiation-curable coating to a surface of a substrate material, b) irradiating the radiation-curable coating so that the coating undergoes a curing process, and c) applying an ink-receptive coating over the irradiated coating.

While not wishing to be bound by any theory, it is believed that the continuous, in-line process of this invention may provide advantages over other production methods. As discussed above, the substrate is coated with a radiation-curable composition, and the coating is irradiated soon thereafter. The irradiated coating undergoes a curing process comprising multiple constituent chemical and physical processes. The constituent irradiation and curing processes include the formation of active sites by irradiation (typically free radicals), the reaction or deactivation of these sites (typically through cross-linking or quenching with adventitious oxygen), the thermally and mechanically induced relaxation of the coating morphology to more stable configurations (typically the molecular relaxation to configurations that are more stable under the circumstances), drying, and similar processes.

It is believed that the irradiated coating, as it undergoes the curing process, will respond to post in-line treatments differently than either a fully cured or a non-irradiated coating (e.g., the above-described polyethylene-coated papers). The "freshly irradiated" coating will have surface properties that are different than those of a substrate having a fully cured or a non-irradiated coating. These differences can be exploited to make subsequently applied coating layers adhere either strongly or weakly to the freshly irradiated coating. Further, the surface properties of the "freshly irradiated coating" can be exploited to increase production efficiency, reduce power consumption, or alter the composition of subsequently applied coating layers. For example, the freshly irradiated coating can be corona-treated as the substrate travels along the production line. If a coating layer must be subjected to corona treatment for a specific period of time in order to produce a layer having acceptable surface properties, it is possible that the same properties could be imparted to a "freshly irradiated" coating in less time using the same corona treatment. As a result, the production line could be run at higher speeds, or power delivered to the corona discharge unit could be reduced, or space requirements for the corona treatment station could be reduced.

The in-line irradiation of the radiation-curable coating can provide additional advantages. An important advantage relates to chemical interactions between the "freshly irradiated" coating and post treatments. Some of the most reactive chemical units present upon irradiation, such as free radicals, are not present to a useful degree in a fully cured coating. A coating designer can employ a "freshly irradiated" coating to impart desirable properties to the ink-jet recording media. Also, the physical, or material, properties of a "freshly irradiated" coating and a fully cured coating are different. Typically, the "freshly irradiated" coating is softer and more compliant than a fully cured one. As a result, the freshly irradiated coating can be processed advantageously using physical adhesion, pattern impression, and similar processes. Further, since the "freshly irradiated" coating is not fully cured, molecular motion and transport into and out of the coating tends to be easier. This molecular motion and transport may allow for interfacial blending with other coating layers, and this can be advantageous in improving adhesion, controlling curl of the media, and responding to other external environmental factors such as changes in humidity.

It may be advantageous to treat the irradiated coating within one (1) minute of irradiation. In such a process, the irradiation station and next treatment station (e.g., a corona discharge unit) in the production line would be within sixty (60) feet of each other. The substrate would travel at a speed of at least sixty (60) feet per minute as it progressed along the production line.

The invention is further illustrated by the following examples using the below Test Methods, but these examples should not be construed as limiting the scope of the invention.

Test Methods

Water Vapor Transmission (WVT)

The water vapor transmission (WVT) rate of the samples was measured using a Vapometer (available from Thwing-Albert Instrument Company) according to the standard procedures described in the instrument manual provided by the manufacturer. Particularly, the samples were equilibrated at 15° C. and 20% relative humidity for about 24 hours. The water vapor transmission (WVT) was then measured on a Vapometer at 15° C. and 20% relative humidity for 24 hours. Measurements were made on three (3) samples, and the average value was reported.

Surface Gloss

The surface gloss of the samples was measured using a Micro Tri-Gloss Meter (available from BYK Gardner, Inc.) according to the standard procedures described in the instrument manual provided by the manufacturer. Particularly, the sample was cut into sheets measuring 8.5 inch by 11 inch. The surface gloss was measured on the sheets prior to imaging (printing). The Micro-Tri Gloss Meter was calibrated at sixty (60) degrees using the standard supplied by the unit. The sample was placed on a flat surface and the surface gloss was measured at sixty (60) degrees. Measurements were made on three (3) samples, and the average value was reported.

Color Gamut

The media samples were imaged (printed) with an Encad Novajet Pro50 printer containing GS ink using an IAS2 test pattern. The printed samples were stored at room temperature for 24 hours. Subsequently, the color gamut of each sample was measured with a X-RITE 918 Tristimulus Reflection Colorimeter (available from X-Rite, Inc.) using standard procedures described in the instrument manual provided by the manufacturer. Generally, media having higher color gamut values provide images of higher color quality.

Optical Density

The media samples were imaged (printed) with a multi-colored test pattern using an Encad Novajet Pro50 printer containing GS ink. The printed samples were stored at room temperature for 24 hours. Subsequently, the optical density of black ink for each sample was measured with a X-Rite 408 Reflection Densitometer (available from X-Rite, Inc.) using standard procedures described in the instrument manual provided by the manufacturer. Generally, media having higher optical density values provide images of higher quality and resolution.

Thermal Stability

The thermal stability of the radiation-cured layer on paper substrate samples was tested. The test was carried out at set temperatures in the range of 150° C. to 200° C., but it can be carried out at any desired temperature. The paper substrate samples were coated with a radiation-curable coating, and the coating was irradiated as described in the Examples below. The irradiated, coated surface of the paper substrate was placed in contact with a heated plate for one (1) minute. Then, the coated surface of the paper was visually inspected to determine whether or not there was any damage or changes to the surface. Such changes could be a chemical change or a significant physical change such as melting or other structural modification. If no surface damage or change was observed, then the coated surface was rated as a "Pass" for that test temperature. If surface damage or change was observed, then the coated surface was rated as a "Fail" for that test temperature.

Water-Fastness

The media samples were imaged (printed) using a small format ink-jet printer, Hewlett-Packard 970 Cxi. The printed samples were stored at room temperature for 24 hours. The density of each of the colored print areas on each sample was measured with a X-Rite 408 Reflection Densitometer (available from X-Rite, Inc.) using standard procedures described in the instrument manual provided by the manufacturer.

The printed samples were then immersed in water for 12 hours. The wet, printed samples were removed and dried at room temperature for 12 hours. Then, the density of each of the colored print areas on each sample was measured with an X-Rite 408 Reflection Densitometer. The loss percentage (%) of color was calculated according to the following equation:

$$\frac{(\text{Initial Density}) - (\text{Final Density})}{(\text{Initial Density})} \times 100 = \text{loss \% of color}$$

Generally, media having a relatively high percentage of color loss possess poor water-fastness, and media having a relatively low percentage of color loss possess good water-fastness.

WORKING EXAMPLES

In the following examples, percentages are by weight based on weight of the coating formulation, unless otherwise indicated. The resulting ink-jet recording media samples were evaluated, and the results are set forth in Tables 1 and 2 below.

Example 1

The following coating formulations were prepared.

| UV Light Radiation-Curable Coating | |
|---|---|
| Laromer PE 44F[1] | 95 wt. % |
| Irgacure 184[2] | 5 wt. % |
| Ink-Receptive Coating (Intercoat) | |
| Water | 70.5 wt. % |
| PVA KM 118[3] | 4 wt. % |
| PVP K-60[4] | 16 wt. % |
| Witcobond 213[5] | 9 wt. % |
| BYK-380[6] | 0.5 wt. % |
| Ink-Receptive Coating (Topcoat) | |
| Water | 90.6 wt. % |
| PVA KM 118 | 4 wt. % |
| PVP K-60 | 5 wt. % |
| BYK-380 | 0.3 wt. % |
| Citric Acid | 0.1 wt. % |
| Polymeric Coating for Back Surface (Aqueous) | |
| Vancryl 610[7] | 93.7 wt. % |
| Lanco PEW 1555[8] | 5 wt. % |
| Surfynol SE-F[9] | 1.0 wt. % |
| Surfynol CT 171[10] | 0.2 wt. % |
| DREW Plus L-407[11] | 0.1 wt. % |

[1]Polyester acrylate (Oligomer), available from BASF Corp., Charlotte, NC 28273.
[2]1-Hydroxycyclohexyl phenyl ketone (photoinitiator), available from Ciba Specialty Chemicals Corp., Tarrytown, NY 10591.
[3]Polyvinyl alcohol, available from Kuraray Company, LTD.
[4]Polyvinyl pyrrolidone, available from ISP Technologies Inc., Wayne, NJ 07470.
[5]Polyurethane dispersion, available from Crompton Corp., Greenwich, CT 06831.
[6]An acrylic leveling additive, available from BYK-Chemie USA, Wallingford, CT 06492.
[7]Ethylene-vinyl chloride copolymer emulsion, available from Air Products, Allentown, PA 18195.
[8]Low molecular weight polyethylene wax, available from Lubrizol, Wickliffe, OH 44092.
[9]Ethoxylated 2,4,7,9-Tetramethyl 5 Decyn-4,7-Diol, available from Air Products, Allentown, PA 18195.
[10]A dispersant agent, available from Air Products, Allentown, PA 18195.
[11]Modified polysiloxane copolymer, available from Drew Industrial Division, Boonton, NJ 07005.

The radiation-curable coating was applied to the front surface of a 5.5 mil clay-coated paper substrate (Centura Cover 60# paper available from Consolidated Papers Inc.) using an offset gravure coater with a gravure roll (85 pyramid roll). The wet coating was cured by a Fusion UV light curing system (Model VP6/I600) (available from Fusion UV Systems, Inc., Gaithersburg, Md. 20878) with two rows of 300 watts/cm H-bulbs. The UV lamp power intensity was set at 100%. After UV curing, the radiation-cured layer was subjected to corona discharge treatment.

After corona discharge treatment, the first ink-receptive coating (intercoat) was applied over the radiation-cured layer using a Meyer rod, and the coating was dried at 225° F. The first ink-receptive layer comprised 28% polyvinyl alcohol, 51% polyvinyl pyrrolidone, 19% polyurethane, and 2% acrylic leveling agent by weight based on dry weight of the ink-receptive layer. The second ink-receptive coating (topcoat) was applied over the intercoat using a Meyer rod and dried at 225° F. The second ink-receptive layer comprised 62% polyvinyl alcohol, 34% polyvinyl pyrrolidone, 2.4% acrylic leveling agent, and 2.5% citric acid by weight based on dry weight of the ink-receptive layer.

The polymeric coating was applied to the back surface of the paper using a Meyer rod, and the coating was dried at 220° F. The polymeric coating comprised about 88% ethylene-vinyl chloride copolymer, 9% low molecular weight polyethylene wax, 2.8% diol surfactants, and 0.2% modified polysiloxane copolymer by weight based on dry weight of the polymeric coating.

Example 2

The following coating formulations were prepared.

| UV Light Radiation-Curable Coating | |
| --- | --- |
| Laromer PE 44F | 75 wt. % |
| TMPTA-N[1] | 20 wt. % |
| Irgacure 184 | 5 wt. % |
| Ink-Receptive Coating (Intercoat) | |
| Same composition as described in Example 1. | |
| Ink-Receptive Coating (Topcoat) | |
| Same composition as described in Example 1. | |
| Polymeric Coating for Back Surface (Aqueous) | |
| Same composition as described in Example 1. | |

[1]Trimethylolpropane triacrylate (tri-functional monomer), available from UCB Chemicals Corp., Smyrna, GA 30080.

In this Example 2, the radiation-curable coating contained a radiation-curable monomer (TMPTA-N) along with an oligomer and photoinitiator. The ink-receptive and moisture-barrier coatings had the same compositions as described in Example 1. The radiation-curable, ink-receptive, and polymeric coatings were applied to a 5.5 mil clay-coated paper (Centura Cover 60# paper) and treated in the same manner as described in Example 1.

EXAMPLE 3

The following coating formulations were prepared.

| UV Light Radiation-Curable Coating | |
| --- | --- |
| Laromer PE 44F | 38 wt. % |
| Ebecryl 588[1] | 38 wt. % |
| TMPTA-N | 20 wt. % |
| Irgacure 184 | 4 wt. % |
| Ink-Receptive Coating (Intercoat) | |
| Same composition as described in Example 1. | |
| Ink-Receptive Coating (Topcoat) | |
| Same composition as described in Example 1. | |
| Polymeric Coating for Back Surface (Aqueous) | |
| Same composition as described in Example 1. | |

[1]Chlorinated polyester acrylate, UCB Chemicals Corp., Smyrna, GA 30080.

In this Example 3, the radiation-curable coating contained two radiation-curable oligomers (Laromer PE 44F and Ebecryl 588), a monomer and photoinitiator. The ink-receptive and moisture-barrier coatings had the same compositions as described in Example 1. The radiation-curable, ink-receptive, and polymeric coatings were applied to a 5.5 mil clay-coated paper (Centura Cover 60# paper) and treated in the same manner as described in Example 1.

Example 4

The following coating formulations were prepared.

| UV Light Radiation-Curable Coating | |
| --- | --- |
| Laromer PE 44F | 38 wt. % |
| CN 301[1] | 38 wt. % |
| TMPTA-N | 20 wt. % |
| Irgacure 184 | 4 wt. % |
| Ink-Receptive Coating (Intercoat) | |
| Same composition as described in Example 1. | |
| Ink-Receptive Coating (Topcoat) | |
| Same composition as described in Example 1. | |
| Polymeric Coating for Back Surface (Aqueous) | |
| Same composition as described in Example 1. | |

[1]Polybutadiene dimethacrylate, Sartomer Company, Exton, PA 19341.

In this Example 4, the radiation-curable coating contained two radiation-curable oligomers (Laromer PE 44F and CN 301) along with a monomer and photoinitiator. The ink-receptive and polymeric coatings had the same compositions as described in Example 1. The radiation-curable, ink-receptive, and polymeric coatings were applied to a 5.5 mil clay-coated paper (Centura Cover 60# paper) and treated in the same manner as described in Example 1.

Example 5

The following coating formulations were prepared.

| UV Light Radiation-Curable Coating | |
| --- | --- |
| Laromer PE 44F | 38 wt. % |
| CN 302[1] | 38 wt. % |
| TMPTA-N | 20 wt. % |
| Irgacure 184 | 4 wt. % |
| Ink-Receptive Coating (Intercoat) | |
| Same composition as described in Example 1. | |
| Ink-Receptive Coating (Topcoat) | |
| Same composition as described in Example 1. | |
| Polymeric Coating for Back Surface (Aqueous) | |
| Same composition as described in Example 1. | |

[1]Polybutadiene diacrylate, Sartomer Company, Exton, PA 19341.

In this Example 5, the radiation-curable coating contained two radiation-curable oligomers (Laromer PE 44F and CN 302) along with a monomer and photoinitiator. The ink-receptive and polymeric coatings had the same compositions as described in Example 1. The radiation-curable, ink-receptive, and polymeric coatings were applied to a 5.5 mil clay-coated paper (Centura Cover 60# paper) and treated in the same manner as described in Example 1.

Example 6

The following coating formulations were prepared.

| UV Light Radiation-Curable Coating | |
|---|---|
| Ebecryl 588 | 40 wt. % |
| CN 301 | 40 wt. % |
| TMPTA-N | 15 wt. % |
| Irgacure 184 | 5 wt. % |

Ink-Receptive Coating (Intercoat)
Same composition as described in Example 1.
Ink-Receptive Coating (Topcoat)
Same composition as described in Example 1.
Polymeric Coating for Back Surface (Aqueous)
Same composition as described in Example 1.

In this Example 6, the radiation-curable coating contained two radiation-curable oligomers (Ebecryl 588 and CN 301) along with a monomer and photoinitiator. The ink-receptive and polymeric coatings had the same compositions as described in Example 1. The radiation-curable, ink-receptive, and polymeric coatings were applied to a 5.5 mil clay-coated paper (Centura Cover 60# paper) and treated in the same manner as described in Example 1.

Example 7

The following coating formulations were prepared.

| UV Light Radiation-Curable Coating | |
|---|---|
| Laromer PE 44F | 20 wt. % |
| Ebecryl 588 | 38 wt. % |
| CN 301 | 20 wt. % |
| TMPTA-N | 17 wt. % |
| Irgacure 184 | 5 wt. % |

Ink-Receptive Coating (Intercoat)
Same composition as described in Example 1.
Ink-Receptive Coating (Topcoat)
Same composition as described in Example 1.
Polymeric Coating for Back Surface (Aqueous)
Same composition as described in Example 1.

In this Example 7, the radiation-curable coating contained three radiation-curable oligomers (Laromer PE 44F, Ebecryl 588, and CN 301) along with a monomer and photoinitiator. The ink-receptive and polymeric coatings had the same compositions as described in Example 1. The radiation-curable, ink-receptive, and polymeric coatings were applied to a 5.5 mil clay-coated paper (Centura Cover 60# paper) and treated in the same manner as described in Example 1.

Example 8

The following coating formulations were prepared.

| UV Light Radiation-Curable Coating | |
|---|---|
| Laromer PE 44F | 20 wt. % |
| Ebecryl 588 | 20 wt. % |
| CN 302 | 38 wt. % |
| TMPTA-N | 17 wt. % |
| Irgacure 184 | 5 wt. % |

Ink-Receptive Coating (Intercoat)
Same composition as described in Example 1.
Ink-Receptive Coating (Topcoat)
Same composition as described in Example 1.
Polymeric Coating for Back Surface (Aqueous)
Same composition as described in Example 1.

In this Example 8, the radiation-curable coating contained three radiation-curable oligomers (Laromer PE 44F, Ebecryl 588, and CN 302) along with a monomer and photoinitiator. The ink-receptive and polymeric coatings had the same compositions as described in Example 1. The radiation-curable, ink-receptive, and polymeric coatings were applied to a 5.5 mil clay-coated paper (Centura Cover 60# paper) and treated in the same manner as described in Example 1.

Example 9

The following coating formulations were prepared.

| UV Light Radiation-Curable Coating | |
|---|---|
| Laromer PE 44F | 59 wt. % |
| TMPTA-N | 20 wt. % |
| Kronos 1072[1] | 15 wt. % |
| Esacure KTO-46[2] | 3 wt. % |
| Irgacure 184 | 1 wt. % |
| Tinuvin 292[3] | 2 wt. % |
| Ink-Receptive Coating (Intercoat) | |
| Water | 73.5 wt. % |
| Airvol 523S[4] | 4 wt. % |
| PVP K-60 | 11 wt. % |
| Sancure 815[5] | 11 wt. % |
| BYK-380 | 0.5 wt. % |
| Ink-Receptive Coating (Topcoat) | |
| Water | 65.6 wt. % |
| Methocel E-15LV[6] | 5 wt. % |
| Methocel K-3[7] | 1 wt. % |
| PolyOX N80[8] | 1 wt. % |
| Witcobond W-213 | 4 wt. % |
| Dispal 23N4-20[9] | 23 wt. % |
| BYK-380 | 0.4 wt. % |
| Polymeric Coating for Back Surface (Aqueous) | |
| Rhoplex B-88[10] | 44.3 wt. % |
| Haloflex 202-S[11] | 44.3 wt. % |
| Surfynol SE-F | 0.9 wt. % |
| Surfynol CT 171 | 0.2 wt. % |
| DREW PLUS L-407 | 0.3 wt. % |
| Lanco PEW 1555 | 10 wt. % |

[1] Titanium dioxide, available from Kronos, Inc., Highstown, NJ 08520.
[2] Blend of trimethylbenzophenone, polymeric hydroxy ketone, and trimethylbenzoyldiphenyl phosphine oxide, available from Sartomer Company, Inc., Exton, PA 19341.
[3] Hindered amine light stabilizer (HALS), available from Ciba Specialty Chemicals Corp., Tarrytown, NY 10591.
[4] Polyvinyl alcohol, available from Air Products, Allentown, PA 18195.
[5] Polyurethane emulsion, available from BF Goodrich Specialties Division, Cleveland, OH 44141.
[6] Hydroxypropyl methylcellulose, available from Dow Chemical Comp., Midland, MI 48642.
[7] Hydroxypropyl methylcellulose, available from Dow Chemical Comp., Midland, MI 48642.
[8] Polyethylene oxide, available from Union Carbide Corp., Danbury, CT 06817.
[9] Alumina sol, available from Vista Chemical Comp., Houston, TX 77079.
[10] Acrylic polymer emulsion, available from Rohm and Haas Comp., New Milford, CT 06776.
[11] Vinyl acrylic terpolymer emulsion, available from NeoResins, Wilmington, MA 01887.

In this Example 9, the radiation-curable coating contained radiation-curable monomer (TMPTA-N) along with an oligomer (Laromer PE 44F), titanium oxide pigment (Kronos 1072), two photoinitiators (Esacure KTO-46, Irgacure 184), dispersant agent, and light stabilizer (Tinuvin 292). The radiation-curable coating was applied to a 5.5 mil clay-coated paper (Centura Cover 60# paper) and treated in the same manner as described in Example 1.

The first ink-receptive coating (intercoat) was applied over the radiation-cured layer using a Meyer rod, and the coating was dried at 225° F. The first ink-receptive layer comprised about 31% polyvinyl alcohol, 38% polyvinyl pyrrolidone, 29% polyurethane, and 2% acrylic leveling agent by weight based on dry weight of the ink-receptive layer. The second ink-receptive coating (topcoat) was applied over the intercoat using a Meyer rod and dried at 225° F. The second ink-receptive layer comprised about 42% hydroxypropyl methylcellulose, 7% polyethylene oxide, 8.5% polyurethane, 41% aluminum oxide, and 1.5% acrylic leveling agent by weight based on dry weight of the ink-receptive layer.

The aqueous polymeric coating was applied to the backside of the paper using a Meyer rod, and the coating was dried at 220° F. The polymeric layer comprised about 33% acrylic polymer, 47% vinyl acrylic terpolymer, 18% low molecular weight polyethylene wax, 1.5% diol, and 0.5% modified polysiloxane copolymer by weight based on dry weight of the polymeric layer.

Example 10

The following coating formulations were prepared.

UV Light Radiation-Curable Coating

Same composition as described in Example 3.

Ink-Receptive Coating (Intercoat)

Same composition as described in Example 9.

Ink-Receptive Coating (Topcoat)

Same composition as described in Example 9.

| Polymeric Coating for Back Surface (UV light radiation-curable) | |
|---|---|
| Laromer PO 43F[1] | 85 wt. % |
| Gasil UV 70C[2] | 10 wt. % |
| Irgacure 184 | 5 wt. % |

[1]Polyether acrylate oligomer, available from BASF Corp., Charlotte, NC 28273.
[2]Silica dioxide, available from Crosfield, Joliet, IL 60435.

In this Example 10, the UV light-radiation curable coating had the same composition as described in Example 3. The ink-receptive coatings had the same compositions as described in Example 9. The radiation-curable and ink-receptive coatings were applied to a 5.5 mil clay-coated paper (Centura Cover 60# paper) and treated in the same manner as described in Example 1. The polymeric layer contained radiation-curable oligomer (Laromer PO 43F) and photoinitiator (Irgacure 184) along with silica dioxide (Gasil UV 70C).

EXAMPLE 11

The following coating formulations were prepared.

| UV Light-Radiation Curable Coating | |
|---|---|
| Laromer 8981[1] | 59 wt. % |
| TMPTA-N | 20 wt. % |
| Ti-Pure R-960[2] | 15 wt. % |
| CGI 819 XF[3] | 1 wt. % |
| Irgacure 184 | 3 wt. % |
| Tinuvin 292 | 2 wt. % |
| Ink-Receptive Coating | |
| Water | 75.8 wt. % |
| Gelita T-7838[4] | 11 wt. % |
| Syntran HX31-65[5] | 13 wt. % |
| Heloxy Modifier 48[6] | 0.2 wt. % |
| Polymeric Coating for Back Surface (Aqueous) | |

Same composition as described in Example 9.

[1]Polyester oligomer, available from BASF Corp., Charlotte, NC 28273.
[2]Titanium dioxide, available from DuPont, Wilmington, DE 19880.
[3]Phenylbis(2,4,6-trimethyl benzoyl)-phosphine oxide, available from Ciba Specialty Chemicals Corp., Tarrytown, NY 10591.
[4]Gelatin, available from Kind & Knox Gelatine, Inc., Sioux City, Iowa 51102.
[5]Acrylate copolymer, available from Interpolymer Corp., Canton, MA 02021.
[6]Diglycidyl ether of dibromo neopentyl glycol, available from Shell Chemical Comp., Houston, TX 77252.

In this Example 11, the radiation-curable coating contained radiation-curable monomer (TMPTA-N) along with an oligomer (Laromer 8981), titanium dioxide pigment (Ti-Pure R-960), two photoinitiators (CGI 819 XF, Irgacure 184), dispersant agent, and light stabilizer (Tinuvin 292). The radiation-curable coating was applied to a 5.5 mil clay-coated paper (Centura Cover 60# paper) and treated in the same manner as described in Example 1.

The ink-receptive coating was applied over the radiation-cured layer using a Meyer rod, and the coating was dried at 302° F. for 2 minutes. The ink-receptive layer comprised about 70% water-soluble gelatin, 29% acrylate copolymer, 1% diglycidyl ether of dibromo neopentyl glycol by weight based on dry weight of the ink-receptive layer.

The aqueous polymeric coating was applied to the backside of the paper and treated in the same manner as described in Example 9.

Example 12

The following coating formulations were prepared.
UV Light Radiation-Curable Coating
Same composition as described in Example 3.
Ink-Receptive Coating (Intercoat)
Same composition as described in Example 1.
Ink-Receptive Coating (Topcoat)
Same composition as described in Example 1.
Polymeric Coating for Back Surface
None In this Example 12, the radiation-curable coating had the same composition as described in Example 3. The ink-receptive coatings had the same compositions as described in Example 1. The radiation-curable and ink-receptive coatings were applied to a 5.5 mil clay-coated paper (Centura Cover 60# paper) and treated in the same manner as described in Example 1. No polymeric coating was applied to the back surface of the paper.

Example 13

The following coating formulations were prepared.

| UV Light Radiation-Curable Coating | |
|---|---|
| Laromer PE 44F | 59 wt. % |
| TMPTA-N | 20 wt. % |
| Kronos 1072 | 15 wt. % |
| Esacure KTO-46 | 3 wt. % |
| Irgacure 184 | 1 wt. % |
| Tinuvin 292 | 2 wt. % |
| Ink-Receptive Coating | |
| Water | 75 wt. % |
| Gelita T-7838 | 11 wt. % |
| Syntran HX31-65 | 13 wt. % |
| Heloxy Modifier 48 | 0.2 wt. % |
| Polymeric Coating for Back Surface (Aqueous) | |
| Rhoplex B-88[10] | 44.3 wt. % |
| Haloflex 202-S[11] | 44.3 wt. % |
| Surfynol SE-F | 0.9 wt. % |
| Surfynol CT 171 | 0.2 wt. % |
| DREW PLUS L-407 | 0.3 wt. % |
| Lanco PEW 1555 | 10 wt. % |

The radiation-curable coating was applied to a 5.5 mil clay-coated paper (Centura Cover 60# paper) and treated in the same manner as described in Example 1.

The ink-receptive coating was applied over the radiation-cured layer using a Meyer rod, and the coating was dried at 302° F. (150° C.) for 2 minutes. The aqueous polymeric coating was applied to the backside of the paper and treated in the same manner as described in Example 9.

The thermal stability of the radiation-cured layer on the paper substrate was tested per the Test Methods described above. The test was conducted at set temperatures in the range of 150° C. to 200° C., and the coated surface was rated a "pass" at each temperature.

Example 14

The following coating formulations were prepared.
UV Light Radiation-Curable Coating
Same composition as described in Example 2.
Ink-Receptive Coating (Intercoat)
Same composition as described in Example 1.

| Ink-Receptive Coating (Topcoat) | |
|---|---|
| Water | 92.2 wt. % |
| PVA KM118 | 3.5 wt. % |
| PVP K-60 | 3 wt. % |
| Syloid 72[1] | 0.8 wt. % |
| Citric acid | 0.1 wt. % |
| BYK-380 | 0.4 wt. % |
| Polymeric Coating for Back Surface (Aqueous) | |
| Same composition as described in Example 1. | |

[1]Silica, available from Grace Davison, Baltimore, MD 21203.

In this Example 14, the radiation-curable coating had the same composition as described in Example 2. The first ink-receptive layer and polymeric back coating had the same compositions as described in Example 1.

The second ink-receptive layer comprised 59% polyvinyl alcohol, 23% polyvinyl pyrrolidone, 13% silica, 3% acrylic leveling agent, and 2% citric acid by weight based on dry weight of the ink-receptive layer.

The radiation-curable, ink-receptive, and polymeric back coatings were applied to a 5.5 mil clay-coated paper (Centura Cover 60# paper) and treated in the same manner as described in Example 1.

Example 15

The following coating formulations were prepared.
UV Light Radiation-Curable Coating
Same composition as described in Example 2.
Ink-Receptive Coating (Intercoat)
Same composition as described in Example 1.

| Ink-Receptive Coating (Topcoat) | |
|---|---|
| Water | 92.6 wt. % |
| PVA KM118 | 3 wt. % |
| PVP K-60 | 2 wt. % |
| Syloid 72 | 2 wt. % |
| Citric acid | 0.1 wt. % |
| BYK-380 | 0.3 wt. % |

Polymeric Coating for Back Surface (Aqueous)
Same composition as described in Example 1.

In this Example 15, the radiation-curable coating had the same composition as described in Example 2. The first ink-receptive layer and moisture-barrier coatings had the same compositions as described in Example 1.

The second ink-receptive layer comprised 49% polyvinyl alcohol, 15% polyvinyl pyrrolidone, 32.5% silica, 2% acrylic leveling agent, and 1.5% citric acid by weight based on dry weight of the ink-receptive layer.

The radiation-curable, ink-receptive, and moisture-barrier coatings were applied to a 5.5 mil clay-coated paper (Centura Cover 60# paper) and treated in the same manner as described in Example 1.

Example 16

In this Example 16, a continuous, in line process was used to manufacture the ink-jet recording medium.

First, the UV-light radiation-curable coating described in Example 9 was applied to the front surface of a 5.5 mil clay-coated paper substrate (Centura Cover 60# paper available from Consolidated Papers Inc.) using an offset gravure coater with a gravure roll (85 quad channeled roll) at a first coating station. The wet coating was cured by a Fusion UV light curing system (Model VP6/I600) (available from Fusion UV Systems, Inc., Gaithersburg, Md. 20878) with two rows of 600 watts/cm H+-bulbs. The UV lamp power intensity was set at 100%. The line speed was greater than 100 feet per minute (fpm). After progressing through the UV light curing station, the web passed through a corona treatment station, wherein the radiation-cured layer was corona-treated using 2.5 kW of corona-treating power. After corona discharge treatment, the web progressed to a second coating station, where the inter-coat ink-receptive coating described in Example 9 was applied over the radiation-cured layer using a Meyer rod. The inter-coat was dried in an in-line dryer at 225° F. Then, the web progressed to a third coating station, where the top coat ink-receptive coating described in Example 9 was applied over the inter-coat layer using a Meyer rod. The topcoat was dried in an in-line dryer at 225° F. Then, the running web passed over a turning bar. The back surface of the running web was coated with the aqueous polymeric coating described in Example 9 in a fourth coating station. The aqueous back coating was applied using a Meyer rod, and the coating was dried at 220° F.

Comparative Example A

The following coating formulations were prepared.

| | |
|---|---|
| UV Light Radiation-Curable Coating | |
| Laromer PE 44F | 47.75 wt. % |
| Laromer 8765[1] | 47.75 wt. % |
| Irgacure 184 | 4.5 wt. % |
| Ink-Receptive Coating (Intercoat) | |
| Same composition as described in Example 9. | |
| Ink-Receptive Coating (Topcoat) | |
| Same compostion as described in Example 9. | |
| Polymeric Coating for Back Surface (Aqueous) | |
| Same composition as described in Example 1. | |

[1]Epoxy polyacrylate (Oligomer), available from BASF Corp., Charlotte, NC 28273

In this Comparative Example A, the radiation-curable coating contained two radiation-curable oligomers (Laromer PE 44F and Laromer 8965) and one photoinitiator (Irgacure 184). The ink-receptive coatings had the same compositions as described in Example 9. The radiation-curable coating and ink-receptive coatings were applied to a 5.5 mil clay-coated paper (Centura Cover 60# paper) and treated in the same manner as described in Example 1.

Comparative Example B

The following coating formulations were prepared.
UV Light Radiation-Curable Coating
None
Ink-Receptive Coating
Same composition as described in Example 13.
Polymeric Coating for Back Surface
None (* JEN COAT 6 mil polycoated paper having a polyethylene coating on both sides of the paper was used.)

The ink-receptive coating was applied to a JEN COAT 6 mil polycoated white glossy paper (a polyethylene coated paper available from Jen-Coat, Inc. Westfield, Mass.) The ink-receptive coating was applied to the surface of the paper using a Meyer rod, and the coating was dried at 250° F. (121° C.) for 2 minutes.

The thermal stability of the radiation-cured layer on the paper substrate was tested per the Test Methods described above. The test was conducted at set temperatures in the range of 150° C. to 200° C., and the coated surface was rated a "fail" at each temperature.

TABLE 1

| Example | WVT (g/in$^2$/24 hrs.) | Surface Gloss (at 60° angle) | Color Gamut Value | Color Density (black color) |
|---|---|---|---|---|
| Example 1 | 2.0 | 88 | 2609 | 2.58 |
| Example 2 | 2.0 | 89 | 2615 | 2.55 |
| Example 3 | 2.0 | 89 | 2605 | 2.57 |
| Example 4 | 2.0 | 88 | 2610 | 2.64 |
| Example 5 | 2.0 | 89 | 2532 | 2.47 |
| Example 6 | 2.0 | 88 | 2566 | 2.57 |
| Example 7 | 2.0 | 89 | 2620 | 2.63 |
| Example 8 | 2.0 | 87 | 2609 | 2.53 |
| Example 9 | 1.4 | 89 | 2601 | 2.78 |
| Example 10 | 4.7 | 87 | 2583 | 2.78 |
| Example 11 | 1.4 | 97 | 2345 | 2.78 |
| Example 12 | 3.8 | 89 | 2605 | 2.57 |
| Example 13 | 1.4 | 97 | 2345 | 2.78 |
| Example 14 | 2.0 | 41 | 2490 | 2.79 |
| Example 15 | 2.0 | 7 | 1605 | 1.87 |
| Example 16 | 4.8 | 83 | 2454 | 2.45 |
| Comp. Ex. A. | 14.3 | 88 | 2601 | 2.78 |

Referring to Table 1, in Comparative Example A, the UV light radiation-curable coating contained two radiation-curable polyester acrylate oligomers and a photoinitiator. The resultant medium demonstrated high surface gloss, but its water vapor transmission (WVT) rate was also high (14.3 grams/sq. in/24 hours).
However, as shown in Examples 1–16, it has been found that media having low water vapor transmission (WVT) rates and different surface gloss values can be prepared using certain UV light radiation-curable, ink-receptive, and moisture-barrier coatings. Moreover, the media in Examples 1–16 provide ink-jet images having good color gamut and optical density.

TABLE 2

(Water Fastness – Loss % of Color)

| Example | Black | Red | Green | Yellow | Blue | Magenta | Cyan |
|---|---|---|---|---|---|---|---|
| Ex. 13 | 35% | 12% | 4% | 7% | 4% | 24% | 4% |
| Comp. B | 54% | 45% | 27% | 12% | 30% | 31% | 11% |

Referring to Table 2, the ink-jet recording medium of Example 13 demonstrated superior water-fastness versus the ink-jet recording medium of Comparative Example B, although the same water-fast, ink-receptive coating was applied to each of the substrates at the same coat weights. It is believed that the superior water-fastness of the medium in Example 13 is due to it being treated at 302° F. (150° C.) for 2 minutes, while the medium in Comparative Example B was treated at 250° F. (121° C.) for 2 minutes. As noted above, the JEN-COAT polycoated paper in Comparative Example B failed the thermal stability test at 150° C.; thus, it had to be heated at lower temperatures to achieve drying and other thermally induced changes. In Example 13, the greater thermal stability of the radiation-cured coating made it possible to process the ink-receptive layer at higher temperatures and obtain superior water-fastness properties.

What is claimed is:
1. A continuous, in-line process for making an ink-jet recording medium, comprising the steps of:
   a) applying a radiation-curable coating to a surface of a substrate material,
   b) irradiating the radiation-curable coating to form a freshly irradiated coating that undergoes a curing process, and
   c) applying an ink-receptive coating over the freshly irradiated coating to form an ink-jet recording medium having a water vapor transmission rate of no greater than 12 grams/100 square inches/24 hours and a surface gloss less than 20.

2. A continuous, in-line process for making an ink-jet recording medium, comprising the steps of:
   a) applying a radiation-curable coating to a surface of a substrate material,
   b) irradiating the radiation-curable coating with ultraviolet light to form a freshly irradiated coating that undergoes a curing process, and
   c) applying an ink-receptive coating over the freshly irradiated coating to form an ink-jet recording medium having a water vapor transmission rate of no greater than 12 grams/100 square inches/24 hours and a surface gloss of at least 70.

3. A continuous, in-line process for making an ink-jet recording medium, comprising the steps of:
   a) applying a radiation-curable coating to a surface of a substrate material,
   b) irradiating the radiation-curable coating to form a freshly irradiated coating that undergoes a curing process,
   c) treating the irradiated coating with a corona discharge, and
   d) applying an ink-receptive coating over the freshly irradiated coating to form an ink-jet recording medium having a water vapor transmission rate of no greater than 12 grams/100 square inches/24 hours and a surface gloss of at least 70.

4. A continuous, in-line process for making an ink-jet recording medium, comprising the steps of:
   a) applying a radiation-curable coating to a surface of a substrate material,
   b) irradiating the radiation-curable coating to form a freshly irradiated coating that undergoes a curing process,
   c) applying a coating comprising adhesion promoters over the freshly irradiated coating and
   d) applying an ink-receptive coating over the coating comprising adhesion promoters to form an ink-jet recording medium having a water vapor transmission rate of no greater than 12 grams/100 square inches/24 hours and a surface gloss of at least 70.

5. A continuous, in-line process for making an ink-jet recording medium, comprising the steps of:
   a) applying a radiation-curable coating to a surface of a substrate material,
      wherein the radiation-curable coating comprises a radiation-curable oligomer and photoinitiator,
   b) irradiating the radiation-curable coating to form a freshly irradiated coating that undergoes a curing process, and
   c) applying an ink-receptive coating over the freshly irradiated coating to form an ink-jet recording medium having a water vapor transmission rate of no greater than 12 grams/100 square inches/24 hours and a surface gloss of at least 70.

6. A continuous, in-line process for making an ink-jet recording medium, comprising the steps of:
   a) applying a radiation-curable coating to a surface of a substrate material,
   b) irradiating the radiation-curable coating to form a freshly irradiated coating that undergoes a curing process, and
   c) applying an ink-receptive coating over the freshly irradiated coating to form an ink-jet recording medium having a water vapor transmission rate of no greater than 12 grams/100 square inches/24 hours and a surface gloss of at least 70, and further
   wherein the ink-receptive coating comprises at least about 40% by weight water-soluble binder resin based on dry weight of the ink-receptive layer.

7. The process of claim 6, wherein the water-soluble binder resin is selected from the group consisting of polyvinyl alcohols; poly(vinyl pyrrolidone); poly(2-ethyl-2-oxazolinc); methylcellulose; poly(ethylene oxide); and copolymers and mixtures thereof.

* * * * *